US012709671B2

(12) United States Patent
Yoon et al.

(10) Patent No.: US 12,709,671 B2
(45) Date of Patent: Aug. 18, 2026

(54) METHOD FOR DEPOLYMERISING POLYESTER

(71) Applicant: KOLON INDUSTRIES, INC., Seoul (KR)

(72) Inventors: Joonyoung Yoon, Seoul (KR); Kwangsu Kim, Seoul (KR); Haelim Cho, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 535 days.

(21) Appl. No.: 18/260,792

(22) PCT Filed: Nov. 3, 2021

(86) PCT No.: PCT/KR2021/015822
§ 371 (c)(1),
(2) Date: Jul. 10, 2023

(87) PCT Pub. No.: WO2022/154224
PCT Pub. Date: Jul. 21, 2022

(65) Prior Publication Data

US 2024/0052131 A1 Feb. 15, 2024

(30) Foreign Application Priority Data

Jan. 14, 2021 (KR) ........................ 10-2021-0005356

(51) Int. Cl.
*C08J 11/14* (2006.01)
*C08J 11/16* (2006.01)

(52) U.S. Cl.
CPC ................ *C08J 11/14* (2013.01); *C08J 11/16* (2013.01); *C08J 2367/02* (2013.01)

(58) Field of Classification Search
USPC ........................................................... 521/48
See application file for complete search history.

(56) References Cited

U.S. PATENT DOCUMENTS 4,605,762 A 8/1986 Mandoki
5,473,102 A 12/1995 Johnson
5,481,024 A 1/1996 Hertenstein
6,136,869 A 10/2000 Ekart
6,706,843 B1 3/2004 Ishihara
7,884,230 B2 2/2011 Jermolovicius
2001/0001792 A1* 5/2001 Sifniades ............. C07D 201/12 528/323
2008/0097120 A1 4/2008 Jermolovicius
2019/0218362 A1 7/2019 Barla

FOREIGN PATENT DOCUMENTS

AT 228789 B 8/1963
CA 611032 A 12/1960
CN 1086206 A 5/1994
CN 001275995 A 12/2000
CN 001413178 A 4/2003
CN 111868316 A 10/2020
DE 10-2007-052394 A1 5/2009
GB 824624 A 12/1959
JP H08-48666 A 2/1996
JP H08325198 A 12/1996
JP 2006299143 A 11/2006
KR 20020093843 A 12/2002
KR 100693707 B1 3/2007
KR 20080041681 A 5/2008
KR 20200099200 A * 8/2020 ............... D01G 5/00

OTHER PUBLICATIONS

KR-20200099200-A Machine Translation (Year: 2020).*
International Search Report dated Feb. 15, 2022.
Extended European Search Report dated Mar. 11, 2025.
Chan, C.H et al., Specific oligomer recovery behavior from cured unsaturated polyester by superheated steam degradation, Polymer Degradation and Stability, 161:1-6 (2019).
Gong, G., et al., Recycling Processes for Waste Polyethylene Glycol Terephthalate, Environmental Protection of Chemical Industry, vol. 24, No. 3, 2004, pp. 199-201.
Office Action From Chinese Patent Office Dated Jun. 18, 2026 Issued for Corresponding Chinese Patent Application.

* cited by examiner

*Primary Examiner* — Terressa Boykin
(74) *Attorney, Agent, or Firm* — Harvest IP Law, LLP

(57) ABSTRACT

Provided is a method of depolymerizing a polyester, the method including adding a degradation agent to the polyester and then contacting the polyester with superheated water vapor.

16 Claims, 3 Drawing Sheets

【Figure 1】
【Figure 2】
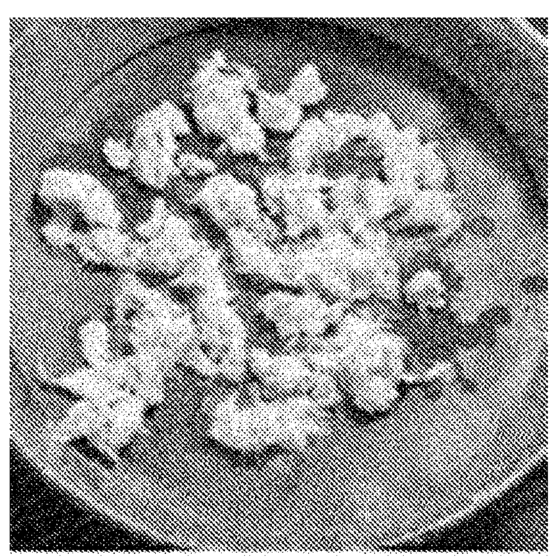

【Figure 3】
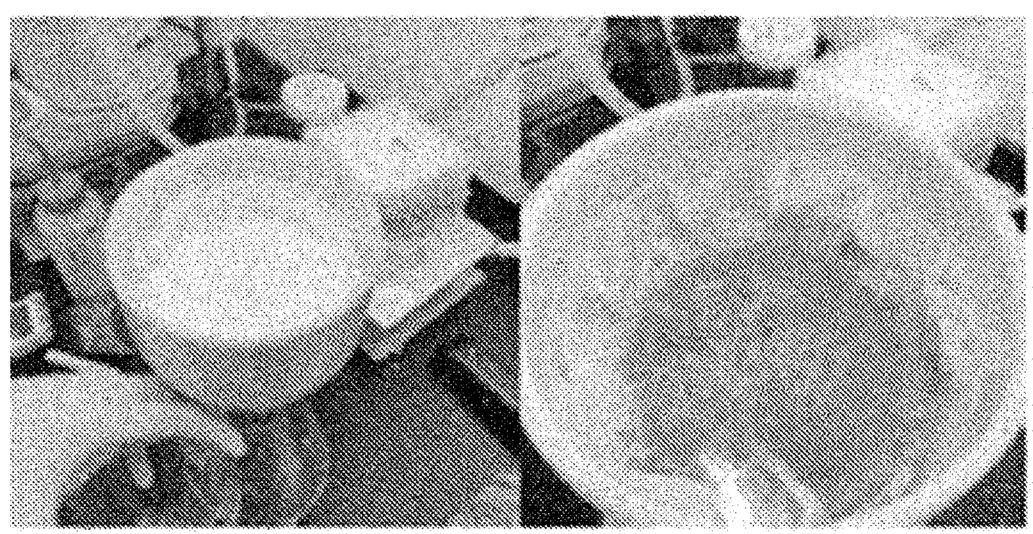
【Figure 4】
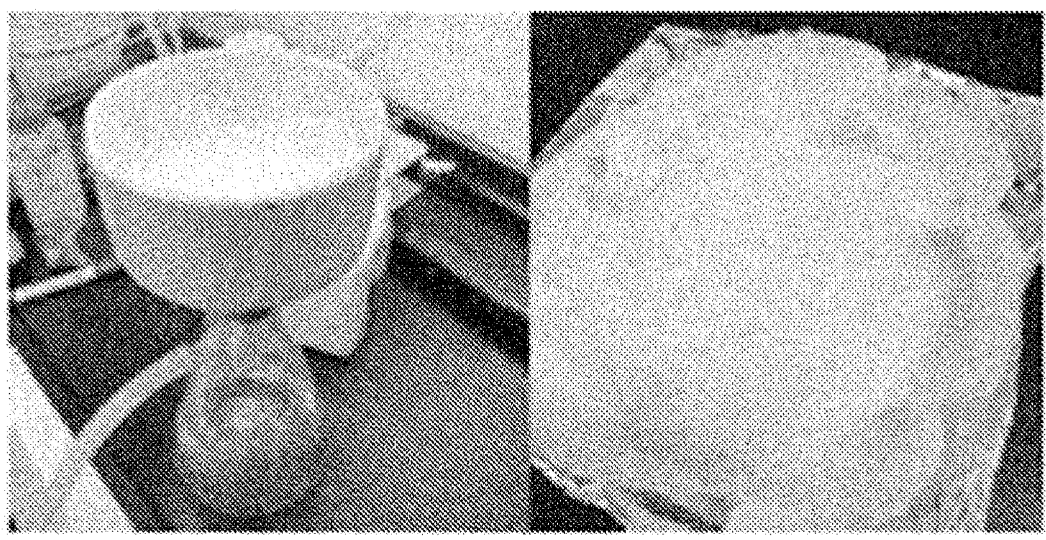

【Figure 5】
【Figure 6】
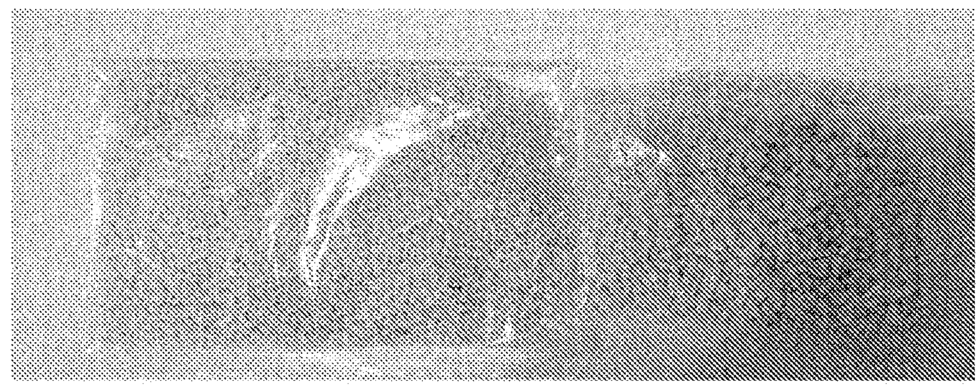

METHOD FOR DEPOLYMERISING POLYESTER

CROSS REFERENCE TO RELATED APPLICATION(S)

This application is a National Stage of International Application No. PCT/KR2021/015822 filed on Nov. 3, 2021, claiming priority based on Korean Patent Application No. 10-2021-0005356 filed on Jan. 14, 2021, the disclosures of which is incorporated herein by reference in their entirety.

TECHNICAL FIELD

The present invention relates to a method for rapid depolymerization of a polyester.

BACKGROUND ART

A polyester represented by polyethylene terephthalate (PET) has excellent chemical stability and thus is used for fibers, fabrics, clothes, films, sheets, beverage bottles, or the like.

As usage of the polyester rapidly increases, various method for recovering and reusing a waste thereof are reviewed. As one of them, a so-called chemical recycling method is performed by depolymerizing the waste of the polyester and the like to convert it into monomers and recover it as the monomers, and use the monomers as raw materials to repolymerize them into recycled polyester such as polyethylene terephthalate and the like.

This chemical recycling, which may separate and secure not much different quality of the recycled polyester from that of a virgin one as raw materials, is expected to realize reuse of resources.

There are three main methods of depolymerization of polyester into monomers: a hydrolysis method using water as a solvent, an alcoholysis method using an alcohol as a solvent, and a glycolysis method using a glycol as a solvent.

The hydrolysis method may be, for example, to decompose polyester into terephthalic acid and ethylene glycol by reacting a polyethylene terephthalate melt with water, and then reacting it with ammonium hydroxide (refer to Patent Document 1). This method has an advantage of using neither a glycol nor alcohol for the reactions, which proceed under high-pressure conditions, and thus requires a special high-pressure reactor.

The alcoholysis method is, for example, to depolymerize polyester by heating the polyester in an alcohol solvent (if necessary, by adding a catalyst), (refer to Patent Documents 2 and 3). This method, when polyethylene terephthalate is depolymerized by using, for example, methanol as a solvent, has an advantage of directly producing dimethylterephthalate (DMT), which is a useful and easy-to-handle monomer, by the depolymerization reaction, which proceeds relatively fast. However, alcohol, when used as a solvent, has a low boiling point and requires pressurization for a reaction to proceed (for example, reaction in supercritical or subcritical methanol), which requires a special high-pressure reactor.

The glycolysis method is to produce bis(p-hydroxyalkyl) terephthalate and ethylene glycol by depolymerizing polyester by heating with a depolymerization catalyst such as sodium carbonate and the like in an alkylene glycol solvent (Patent Documents 4 and 5). For example, when the ethylene glycol is used as the solvent, the bis(p-hydroxyethyl) terephthalate (BHET) is produced through the depolymerization reaction, and dimethylterephthalate (DMT) may be recovered by adding methanol thereto under a transesterification catalyst to carry out a transesterification reaction. The glycolysis method may carry out the reactions under a normal pressure but requires a relatively longer reaction time, which needs to be shortened, and has a problem of deteriorating glycol of the solvent by heating for a long time.

In addition, these known methods of depolymerizing polyester need a reaction time of at least several hours and thus have difficulties in processing a large amount of polyester waste, and also conduct the reaction under high temperature or high-pressure conditions and thus require special equipment capable of withstanding these conditions.

On the other hand, in the depolymerization of polyester, since all polyester raw materials are not transparent like beverage bottles, and in particular, in the depolymerization of colored polyester feedstocks such as fibers, fabrics, and clothes, color removal of dyes added during processing has a great impact on quality of final products.

In particular, among the polyester feedstocks, colored polyester waste fibers, which are waste fibers dyed in the processing, contain the dyes whose input amount is rapidly increased depending on colors and thinness of the fibers. Accordingly, the colored polyester feedstocks have limited uses and in order to create added values, may be decomposed into raw materials through the depolymerization and repolymerized, which is reasonable and environmentally-friendly but not economical due to high process costs.

The dyes for the colored polyester are removed through a solvent treatment and an adsorption process (activated carbon) for decolorization during the depolymerization process, wherein a solvent used for the removal is expensive, the recovery cost is high, and the more the dyes, the more rapidly reduced its use, increasing overall process costs and turning out to be substantially uneconomical. Accordingly, the polyester depolymerization in general uses polyester bottle flakes having high recovery purity.

PRIOR ART DOCUMENTS

Patent Documents (Patent Document 1) Japanese Patent Laid-Open Publication No. 2003-527363 (Publication Date: 2003 Sep. 16)

(Patent Document 2) Japanese Patent Laid-Open Publication No. 1999-100336 (Publication Date: 1999 Apr. 13)

(Patent Document 3) Japanese Patent Laid-Open Publication No. 2003-300916 (Publication Date: 2003 Oct. 21)

(Patent Document 4) Japanese Patent Laid-Open Publication No. 2002-167468 (Publication Date: 2002 Jun. 11)

(Patent Document 5) Japanese Patent Laid-Open Publication No. 2004-300115 (Publication Date: 2004 Oct. 28)

DISCLOSURE

Technical Problem

According to an embodiment, provided is a method for depolymerizing colored polyesters that can depolymerize colored polyesters in a short time while removing dyes from colored polyesters at a low cost and with high efficiency, has high depolymerization efficiency, and is economical because the entire depolymerization composition does not need to be heated to the depolymerization temperature.

According to another embodiment, a composition for polymerizing recycled polyester prepared by the method of depolymerizing the polyester is provided.

According to another embodiment, a recycled polyester prepared by using the composition for polymerizing recycled polyester is provided.

Technical Solution

According to an embodiment, a method of depolymerizing a polyester includes adding a degradation agent including an alkali, an acid, a salt thereof, a mono-alcohol, a polyhydric alcohol, or a mixture thereof, to the polyester, and contacting the polyester with superheated water vapor to perform depolymerizing.

A temperature of the superheated water vapor may be 250° C. to 450° C. The superheated water vapor may be applied with an injection pressure of 0.1 bar to 2 bar.

The depolymerizing may be performed for 1 minute to 120 minutes.

The alkali may include sodium hydroxide, potassium hydroxide, lithium hydroxide, ammonia, or a mixture thereof.

The acid may include hydrochloric acid, nitric acid, sulfuric acid, carbonic acid, phosphoric acid, acetic acid, hypochlorous acid (HCIO), or a mixture thereof.

The salt may include carbonate, hydrogen carbonate, phosphate, sulfate, sulfite, nitrate, silicate, hypochlorite, formate, acetate, citrate, oxalate, or a mixture thereof.

The mono-alcohol may include methanol, ethanol, propanol, butanol, or a mixture thereof.

The polyhydric alcohol may include ethylene glycol, n-propylene glycol, isopropylene glycol, diethylene glycol, polyethylene glycol, triethylene glycol, dipropylene glycol, 1,3-butanediol, 1,4-butanediol, glycerine, benzyl alcohol, polypropylene glycol, pentaerythritol, trimethylolpropane, or a mixture thereof.

The degradation agent may be added at 0.75 mol to 3.0 mol per 1.0 mol of a dibasic acid in the polyester.

The method of depolymerizing the polyester may further include performing solid-liquid separation of liquid-phase alkylene glycol and a solid-phase dibasic salt from the depolymerization product obtained in the depolymerizing, dissolving the solid-phase dibasic salt in water, neutralizing an aqueous solution of the dibasic salt with an acid to precipitate a dibasic acid crystal, and performing solid-liquid separation of the dibasic acid crystal from a precipitation product.

The method of depolymerizing the polyester may further include removing impurities from the aqueous solution of the dibasic salt.

The method of depolymerizing the polyester may further include recrystallizing the dibasic acid crystal.

According to another embodiment, provided is a composition for polymerizing recycled polyester, including a dibasic acid and an alkylene glycol, obtained by the method of depolymerizing the polyester according to an embodiment.

According to another embodiment, a recycled polyester prepared using the composition for polymerizing polyester according to an embodiment is provided.

A color of the recycled polyester may have an L-value of 60 or higher.

Advantageous Effects

The method of depolymerizing the polyester according to an embodiment can depolymerize colored polyesters in a short time while removing dyes from colored polyesters at a low cost and with high efficiency, has high depolymerization efficiency, and is economical because the entire depolymerization composition does not need to be heated to the depolymerization temperature.

DESCRIPTION OF THE DRAWINGS

FIG. 1 is a photograph of a colored polyethylene terephthalate.

FIG. 2 is a photograph of decolorized polyethylene terephthalate.

FIG. 3 is a photograph showing a depolymerization product being rinsed to remove impurities.

FIG. 4 is a photograph of terephthalic acid recovered after rinsing and acid precipitation.

FIG. 5 is a photograph of colored polyethylene terephthalate fibers and recovered terephthalic acid before and after depolymerization.

FIG. 6 is a comparison of polyester chips and virgin polyester chips repolymerized with recovered terephthalic acid as raw material.

MODE FOR INVENTION

Advantages and characteristics of this disclosure, and a method for achieving the same, will become evident referring to the following exemplary embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined.

In addition, unless explicitly described to the contrary, the word "comprise," and variations such as "comprises" or "comprising," will be understood to imply the inclusion of stated elements but not the exclusion of any other elements. Further, the singular includes the plural unless mentioned otherwise.

A method of depolymerizing a polyester according to an embodiment includes adding a degradation agent to polyester, and contacting the polyester with superheated water vapor to perform depolymerizing.

The polyester nay be made by polymerizing a dibasic acid with alkylene glycol, and may be polyethylene terephthalate (PET), polybutylene terephthalate, and polyethylene naphthalate, or polycaprolactone made by polymerizing caprolactone. By depolymerizing these polyesters, the dibasic acid, alkylene glycol, or caprolactone may be recovered as monomers.

The alkylene glycols that can be obtained by depolymerizing polyester may include, for example, ethylene glycol, diethylene glycol, triethylene glycol, polyethylene glycol, propylene glycol, and dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanediol, 1,4-benzene diol, and the like. For example, if the polyester is polyethylene terephthalate, ethylene glycol can be recovered as an alkylene glycol, and if the polyester is polybutylene terephthalate, butylene glycol can be recovered as a monomer.

The dibasic acid that can be obtained by depolymerizing polyester may include, for example, terephthalic acid, phthalic acid (ortho), isophthalic acid, dibromoisophthalic acid, sodium sulfoisophthalate, phenylenedioxy dicarboxylic acid, 4,4'-diphenyldicarboxylic acid, 4,4'-diphenylether dicarboxylic acid, 4,4'-diphenylketone dicarboxylic acid, 4,4'-diphenoxyethanedicarbonic acid, 4,4'-diphenylsulfonic dicarbonic acid, and an aromatic dicarboxylic acid such as 2,6-naphthalene dicarboxylic acid, trimellitic acid, and pyromellitic acid. Other dicarboxylic acid may include, for example, aliphatic ring dicarboxylic acid such as hexahydroterephthalic acid and hexahydroisophthalic acid, and an aliphatic dicarboxylic acid such as succinic acid, glutaric acid, adipic acid, pimelic acid, suberic acid, azelaic acid, sebacic acid, undecacarbonic acid, and dodecadic dicarboxylic acid.

As a raw material for polyester depolymerization, molded products including polyester, especially waste, may be used. The waste may be a residue and a defective product generated during the manufacture of molded products as well as a waste generated after using the molded products including polyester. For example, the waste may include used PET bottles, cups, strings, packing packs, etc., or burrs and sprues formed during their moldings, cups after vacuum molding, sheets after cutting, fibers, fabrics, clothes, films, sheets, etc.

In particular, the method of depolymerizing polyester according to an embodiment may economically and efficiently depolymerize colored polyester such as fibers, fabrics, clothes, and the like, which include dyes in a large amount, as described hereinafter.

Herein, in the polyester waste, a content of polyester may be 60 wt % to 100 wt % based on a total weight of the polyester waste. When the content of polyester is less than 60 wt %, the depolymerization process may obtain so much smaller an amount of subsidiary raw materials than those of by-reactants and non-recyclable separated and purified wastes, which is substantially uneconomical.

When the polyester waste is used as a feedstock for the depolymerization, the waste may be optionally washed before the depolymerization and pre-treated to remove contaminants attached to the waste, such as dyes, contents, soil, or the like.

In addition, the method of depolymerizing polyester according to an embodiment may provide polyester waste as relatively large slices as recovered for the depolymerization reaction due to a fast reaction rate, but in order to more efficiently proceed the reaction, the waste may be mechanically cut, pulverized, or processed. The pulverization may be carried out by using a known suitable means, for example, a hammer mill etc. to pulverize the polyester waste into small pieces with a size of 2 mm to 8 mm and provide them for the depolymerization reaction.

In addition, if necessary, the pulverized chips may be immersed in a solvent to extract dyes and the like or to separate lighter components than the solvent, or the pulverized material may be blown away by wind or sieved to recover ones with predetermined size, which are provided for the depolymerization reaction.

However, the method of depolymerizing polyester according to an embodiment may carry out the depolymerization reaction without completely removing foreign matters, which have no significant effects on the depolymerization reaction, and may proceed without the pretreatment processes such as classification, washing, pulverization, and the like.

The method of depolymerizing polyester according to an embodiment is dry depolymerization by direct contact of superheated water vapor with the polyester.

Unlike a conventional wet method of immersing polyester in a depolymerization composition, this method makes the superheated water vapor directly react with polyester and thus may secure high depolymerization efficiency, and also the depolymerization composition including a solvent to a depolymerization temperature need not be heated and thus is economical. In addition, as the superheated water vapor is applied to the polyester, since the depolymerization occurs simultaneously with decoloring, this method is advantageous for depolymerization of colored polyester including dyes.

In addition, since the depolymerization reaction is carried out by directly applying the superheated water vapor to polyester, no high-pressure reactor is required, but a batch or continuous reactor may be adopted.

For example, the contact of the polyester with the superheated water vapor may be achieved by directly spraying the superheated water vapor at a high temperature of 250° C. to 450° C. under an injection pressure of 0.1 bar to 2 bar to the polyester, wherein the temperature of the superheated water vapor may be, for example, 280° C. to 380° C.

When the temperature of the superheated water vapor is less than 250° C., the depolymerization of the polyester takes too long a time, which may be less economical, but when greater than 450° C., the depolymerization does not proceed under an inert atmosphere, which may accompany carbonization. When the pressure of the superheated water vapor is less than 0.1 bar, there may be no great effect in terms of actual decomposition time, compared with that of the conventional wet reaction, due to lack of contact effectiveness of the directly reacting water vapor, but when the pressure of the superheated water vapor is greater than 2 bar, the polyester, a thermoplastic material, is melted rather than decomposed and thus forms a large lump where it directly contacts with the superheated water vapor, which may prolong decomposition time from the surface to the inside.

The depolymerization reaction may be performed for 1 minute to 120 minutes, or 10 minutes to 60 minutes. The depolymerization reaction time may be increased within 120 minutes, as impurities including dyes are more present in the polyester, as the polyester for a treatment is larger, and as the superheated water vapor is at a lower temperature.

On the other hand, the method of depolymerizing polyester may include adding a degradation agent to the polyester prior to contacting the polyester with the superheated water vapor. When superheated water vapor at a high temperature alone is treated without the degradation agent, since the polyester, a thermoplastic resin, is dissolved before being decomposed into monomers, and a portion of the dissolved polyester is not decomposed but peroxidized and carbonized, the polyester may be pretreated by the degradation agent to help the polyester decomposed into the monomers before being dissolved.

The degradation agent may include an alkali, an acid, a salt thereof, a mono-alcohol, a polyhydric alcohol, or a mixture thereof.

For example, the alkali may include a hydroxide of an alkali metal or alkaline earth metal, ammonia, or a mixture thereof. The alkali metal may be a monovalent metal such as lithium, sodium, potassium, rubidium, or cesium, of which sodium or potassium is relatively inexpensive. The alkaline-earth metal may be beryllium, magnesium, calcium, strontium, barium, or radium. The hydroxide of an alkali metal may include sodium hydroxide, potassium hydroxide, or lithium hydroxide. Among them, sodium hydroxide has an excellent reaction rate and reaction yield when used in combination with ethylene glycol, etc.

The acid may be an organic acid or inorganic acid, for example hydrochloric acid, nitric acid, sulfuric acid, carbonic acid, phosphoric acid, acetic acid, hypochlorous acid (HClO), or a mixture thereof.

The salt may include an inorganic salt such as carbonate, a hydrogen carbonate salt, phosphate, sulfate, sulfite, nitrate, silicate, hypochlorite, an organic salt such as formate, acetate, citrate, oxalate, or a mixture thereof, and the salt may include, for example, sodium carbonate, sodium hydrogen carbonate, potassium carbonate, potassium hydrogen carbonate, trisodium phosphate (hydrate), sodium hypochlorite, or a mixture thereof.

The polyhydric alcohol may include ethylene glycol, n-propylene glycol, isopropylene glycol, diethylene glycol, polyethylene glycol, triethylene glycol, dipropylene glycol, 1,3-butanediol, 1,4-butanediol, glycerine, benzyl alcohol, polypropylene glycol, pentaerythritol, trimethylolpropane, or a mixture thereof. Among these polyhydric alcohols, ethylene glycol, n-propylene glycol, isopropylene glycol, diethylene glycol, polyethylene glycol, triethylene glycol, and glycerine, which have a high boiling point and are relatively reactive, may be used.

The mono-alcohol may include methanol, ethanol, propanol, butanol, or a mixture thereof, and may include an alkyl ether compound of the polyhydric alcohol such as the diol and triol described above, for example diethylene glycol monomethyl ether, benzyl alcohol, 2-ethyl hexanol, and the like.

Since the degradation agent reacts with both polyester and dye, the degradation agent may be added in an amount of 0.75 mol to 3.0 mol based on 1.0 mol of dibasic acid in the polyester, and for example, a monovalent degradation agent (e.g., sodium hydroxide) may be added in an amount of 1.5 mol to 3.0 mol, and a divalent degradation agent (e.g., calcium carbonate) may be added in an amount of 0.75 mol to 1.5 mol.

For example, when polyethylene terephthalate is decomposed by using sodium hydroxide as the degradation agent, since its reaction scheme is PET (polyethylene terephthalate)+2NaOH→TPA salt (disodium terephthalate)+EG (ethylene glycol), 2 mol (420 g) of NaOH per 1 mol of TPA is required to decompose 1 kg of PET.

In addition, when the polyester feedstock is fibers, an amount of dyes added during the processing varies from 0.5 wt % to 20 wt % (based on the weight of fabric (o.w.f.)) of a weight of the polyester fibers, an amount of the degradation agent may be 2.0 mol or more to 1.0 mol of dibasic acid included in the polyester to fully decompose the dyes and the polyester fibers.

Next, the alkylene glycol and dibasic salt are separated and recovered from the depolymerization product obtained in the depolymerizing step.

For example, when different alcohols from alkylene glycol, which is a component of the polyester, are used as the degradation agent, the alkylene glycol produced by the depolymerization and the degradation agent are mixed once but may be separated to recover the alkylene glycol produced by the depolymerization therefrom.

A method of separating the alkylene glycol produced by the depolymerization reaction from the degradation agent is not particularly limited in the present invention, but an appropriate method may be selected depending on a target compound, for example, a distillation concentration method. The distillation concentration may be performed by using a conventional distillation concentration device, for example, a vacuum distillation continuous device, a vacuum distillation batch device, and the like.

When the alkylene glycol produced by the depolymerization reaction is the same type as the degradation agent, it is not necessary to separate the produced alkylene glycol.

On the other hand, the depolymerization may be carried by selectively applying a hydrolysis method using water, an alcoholysis method using alcohol, and a glycolysis method using glycol according to types of the degradation agent, thereby obtaining different types of dibasic acids.

When the glycolysis method is used to depolymerize polyester, a dibasic salt obtained therefrom may vary depending on the types of the degradation agents used in the depolymerization reaction. For example, when ethylene glycol is used as the degradation agent for the depolymerization of the polyethylene terephthalate, bis(p-hydroxyethyl) terephthalate (BHET) as monomers may be obtained, and when propylene glycol is used as the degradation agent for the depolymerization, bis(8-hydroxyethyl isopropyl)terephthalate (BHEPT) may be mainly obtained as monomers.

In addition, when benzyl alcohol and tripotassium phosphate are used as the degradation agent, an ester compound of an oligomer obtained therefrom has good solubility into chloroform and the like and thus may be efficiently recovered through solvent extraction. Furthermore, the ester compound of the dibasic acid or oligomer may be recovered by using devices for filtration, distillation, or the like.

The ester compound (e.g., BHET) of the dibasic acid or oligomer thus obtained may also be recovered as the methyl ester (e.g., DMT) of the dibasic acid or oligomer by a transesterification reaction with methanol.

The transesterification reaction may be performed by appropriately using, for example, a known method of transesterifying a depolymerization concentrate and methanol under a transesterification catalyst (an alkali metal compound, etc.) at 65° C. to 85° C. for 0.5 hours to 5 hours, and preparing a slurry in which solid DMT is dispersed in a mixed solution of methanol, alkylene glycol, and the like. In addition, a cake containing DMT may be separated by using a solid-liquid separator and the like, and then purified through distillation, recovering purified DMT.

On the other hand, when the glycolysis method is used to depolymerize the polyester, dibasic acids or dibasic salts such as dialkali metal salts of oligomers may be produced, wherein these products may vary depending on types of alkali metals used in the depolymerization reaction. For example, when the sodium hydroxide is used as the degradation agent to depolymerize the polyethylene terephthalate, sodium terephthalate with ethylene glycol is produced.

Of these, dibasic salts (e.g., sodium terephthalate) are insoluble in alkylene glycol and form solid crystals, which can be easily separated from the solvent by a filtration method such as solid-liquid separation. Furthermore, alcohols attached to the obtained powdery crystals can be removed by washing with alcohols such as methanol or ethanol.

Subsequently, the crystals of the dibasic salt may be dissolved in water, followed by a neutralization reaction with a mixture of acids to obtain a dibasic acid (e.g., terephthalic acid). The dibasic acid also precipitates as crystals in water and may be recovered by solid-liquid separation from water, for example by centrifugation.

An amount of water added during the recovery process may be from 3 to 10 parts by weight based on 1 part by weight of the dibasic salt. In order to separate the dibasic acid therefrom, a content of acid added thereto may be equal to or more than that of alkali metals included in the dibasic salt by moles, wherein types of the acid may be inorganic acids such as hydrochloric acid, sulfuric acid, phosphoric acid, and the like which are strong acids with pH 2 or organic acids such as formic acid, acetic acid, oxalic acid, and the like, wherein the inorganic acid, particularly, hydrochloric acid or sulfuric acid, may be appropriate to reduce impurities in the produced monomers. The neutralization reaction may be performed at 65° C. to 85° C. and in general completed within 0.5 hours to 5 hours.

On the other hand, the method of depolymerizing polyester may further optionally include removing impurities included in polyester molded products, wastes, or the like in the aqueous solution of the dibasic salt.

Means for removing the impurities are not particularly limited but may include any appropriate technique and device. For example, solids such as unreacted resins (polyethylene, polypropylene, polyvinyl chloride, etc.) other than polyester, and undissolved degradation agents such as alkali metals and the like, etc. may be removed by using a mesh or the like. In addition, the mesh does not remove dyes, fillers, and the like, which may be removed centrifugal separation, and filtration by an adsorbent such as activated carbon and the like, etc.

Since the obtained dibasic acid crystals show particle distribution characteristics of several micrometers to tens of micrometers, recrystallization of dibasic acid crystals with a commercially available particle size (100 μm or more) may be optionally included. The recrystallization method is not particularly limited but may be, for example, performed at a high temperature under a high pressure after mixing the dibasic acid crystals with water.

The dibasic acid and the alkylene glycol obtained by the method of depolymerizing polyester may be reused as monomers for polymerizing recycled polyester. Specifically, a composition for polymerizing the recycled polyester including the dibasic acid and the alkylene glycol obtained in the method of depolymerizing polyester may be esterified and polycondensed, preparing the recycled polyester.

The esterification is a reaction between a dibasic acid and alkylene glycol which are recovered monomers, for example, terephthalic acid and ethylene glycol. This reaction may proceed without a catalyst but may also be performed under a catalyst of an alkaline-earth metal compound such as magnesium, calcium, and the like, a metal compound such as titanium, zinc, manganese, and the like, etc.

Subsequently, the products from the esterification process are polycondensed, preparing a recycled polyester resin. Herein, either solution polymerization or solid polymerization may be used.

In addition, after the solid polymerization, a compound capable of promoting a water treatment and/or crystallization may be added to adjust quality, if needed, and in addition, a polycondensation catalyst or a stabilizer may be added at the beginning or during the polycondensation process.

Herein, the water treatment may be, for example, carried out by contacting the recycled polyester having resin solid particles with water, aqueous vapor, aqueous vapor-containing inert gas, aqueous vapor-containing air, etc. The compound promoting the crystallization may be, for example, a polyolefin-based thermoplastic resin such as polyhexamethylene terephthalate, an inorganic compound, a higher aliphatic compound, a polyether-based compound, polypropylene, polyethylene, and the like, and these compounds may be added in an amount of 1 ppm to 100 ppm to the recycled polyester resin.

The polycondensation catalyst may include a compound such as germanium, antimony, titanium, aluminum, and the like. An amount of the polycondensation catalyst may be 2 ppm to 800 ppm, or for example 4 ppm to 500 ppm, as a weight of the catalytic metal element relative to the total weight of the dibasic acid component.

The recycled polyester may also include a phosphoric acid ester such as trimethyl phosphate, triethyl phosphate, triphenyl phosphate, and triethyl phosphonoacetate, a phosphorous acid ester such as triphenyl phosphite and trisodium phosphite, or a phosphorus compound such as methyl phosphate, dibutyl phosphate, monobutyl phosphate, phosphoric acid, phosphorous acid, hypophosphorous acid, and polyphosphoric acid, as a stabilizer. An amount of stabilizer may be less than or equal to 1000 ppm, for example less than or equal to 500 ppm, or less than or equal to 300 ppm, as weight of the phosphorus element in the stabilizer relative to the total weight of the recycled polyester.

On the other hand, as described above, the method of depolymerizing polyester according to an embodiment uses superheated water vapor to achieve the depolymerization simultaneously with decolorization, wherein the degradation agent is added thereto to solve the problem that polyester is dissolved and decolorized only on the surface but not decolorized inside and partially peroxidized and carbonized, and when the dibasic acid and the alkylene glycol obtained therefrom are used to manufacture recycled polyester, the recycled polyester has a color with an L value of 60 or more, for example, 65 to 95.

The L, a, and b color system is used internationally as a standard for color evaluation of polyester. These color values are one of the color systems to standardize color measurements and describe perceptible colors and color differences. In this system, L is a lightness factor, and a and b are color measurements. Herein, L is a numerical factor representing brightness and very important in manufacturing fibers, fabrics, or clothes. In addition, positive b means a yellowish coloration, negative b means a bluish discoloration, positive a means a reddish coloration, and negative a means a greenish coloration.

The L, a, and b values are defined in Korean Industrial Standards (KS) related to color measurements of KS A 0061, 0063, 0064, 0065, 0066, 0067, 0084, 0085, 0089, 0114, etc., and for example, may be obtained by using 50 g of a polyester resin, removing moisture therefrom in the air, and putting it in a colorimeter, SA-2000, to measure its color 10 times and calculate an average thereof.

The L value of the recycled polyester has relationship with purity of the recycled dibasic acid and alkylene glycol. For example, the lower the L value, the more impurities or matting agents such as titanium oxide ($TiO_2$) therein. When the L value is less than 60, the amount of the impurities is too large, which may color the obtained polyester after polymerization or fiberization, or generate many side reactions during the polymerization, so the polyester may not be used as a high value-added material but is mainly applied to the same use as mechanically recycled polyester. On the other hand, when the L value is greater than 95, which is difficult to reach even by existing virgin materials, the recycled polyester may achieve this L value by decolorization, addition of a purification process or an increase in residence time, etc., which may increase a unit production volume and a process cost and turn out to be less economical.

DETAILED DESCRIPTION OF THE EMBODIMENTS

Hereinafter, specific examples of the invention are presented. However, the examples described below are only intended to specifically illustrate or describe the invention, and this should not limit the scope of the invention.

Examples 1 to 3

10 kg of a polyethylene terephthalate colored waste fiber feedstock (90 wt % of PET) was decolorized, and then impregnated in a 50 wt % sodium hydroxide (NaOH) aqueous solution to set an impregnation amount respectively to 350 wt %, 400 wt %, and 500 wt % (based on a weight of fabric (o.w.f.)).

Herein, a content of the sodium hydroxide impregnated in the polyethylene terephthalate is 2.1 mol, 2.4 mol, and 3.0 mol, respectively, based on 1 mol of terephthalic acid.

Each of them was put into a superheated water vapor system, and then treated for 30 minutes by spraying superheated water vapor under a pressure of 1.5 bar at 350° C.

Subsequently, after washing decomposed and depolymerized products therefrom, sulfuric acid ($H_2SO_4$) was added thereto for reduction to adjust pH from 11.2 to 2.41, recovering terephthalic acid (TPA) and ethylene glycol (EG).

Examples 4 and 5

10 kg of a polyethylene terephthalate colored waste fiber feedstock (90 wt % of PET) was decolorized, and then impregnated in a 50 wt % sodium hydroxide (NaOH) aqueous solution to set an impregnation amount, respectively, to 200 wt % and 550 wt % (based on a weight of fabric (o.w.f.)).

Herein, a content of the sodium hydroxide impregnated in the polyethylene terephthalate was respectively 1.0 mol and 3.3 mol based on 1 mol of terephthalic acid.

Each of them was put into a superheated water vapor system, and then treated for 60 minutes by spraying superheated water vapor under a pressure of 1.5 bar at 350° C.

Subsequently, after washing decomposed and depolymerized products therefrom, sulfuric acid ($H_2SO_4$) was added thereto for reduction to adjust pH into 3.0 or less, recovering terephthalic acid (TPA) and ethylene glycol (EG).

Comparative Example 1

10 kg of the polyethylene terephthalate colored waste fiber feedstock (90 wt % of PET) is put into the superheated water vapor system, and then treated for 30 minutes by spraying superheated water vapor under a pressure of 1.5 bar at 350° C.

Subsequently, after washing decomposed and depolymerized products therefrom, sulfuric acid ($H_2SO_4$) was added thereto for reduction to adjust pH into 3.0 or less, recovering terephthalic acid (TPA) and ethylene glycol (EG).

Comparative Example 2

10 kg of a polyethylene terephthalate colored waste fiber feedstock (90 wt % of PET) was decolorized, and then impregnated in a 50 wt % sodium hydroxide (NaOH) aqueous solution to set an impregnation amount to 350 wt % (based on a weight of fabric (o.w.f.)).

Herein, a content of the sodium hydroxide impregnated in the polyethylene terephthalate was 2.1 mol based on 1 mol of terephthalic acid.

This was put into a superheated water vapor system set at a pressure of 13.5 bar and 196° C., and then depolymerized for 180 minutes.

Subsequently, after washing a decomposed and depolymerized product therefrom, sulfuric acid ($H_2SO_4$) was added thereto for reduction to adjust pH into 3.0 or less, recovering terephthalic acid (TPA) and ethylene glycol (EG).

Experimental Example 1: Observation of Depolymerization Reaction

The depolymerization process of Example 1 was examined, and photographs of each step are shown in FIGS. 1 to 6.

FIG. 1 is a photograph of colored polyethylene terephthalate, FIG. 2 is a photograph of decolorized polyethylene terephthalate, FIG. 3 is a photograph showing a depolymerization product being rinsed to remove impurities, FIG. 4 is a photograph of terephthalic acid recovered after rinsing and acid precipitation, FIG. 5 is a photograph of colored polyethylene terephthalate fibers and recovered terephthalic acid before and after depolymerization, and FIG. 6 is a comparison of polyester chips and virgin polyester chips repolymerized with recovered terephthalic acid as a raw material.

Experimental Example 2: Measurement of Efficiency of Depolymerization Reaction The examples and the comparative examples were examined with respect to a residual amount of non-decomposed polyethylene terephthalate (PET) to measure a decomposition rate of the PET feedstock, and also analyzed through NMR and HPLC to calculate a terephthalic acid (TPA) yield, and the results are shown in Table 1. Herein, the rest excluding the terephthalic acid was identified as by-reactants, non-reactants, and impurities.

TABLE 1

| | PET decomposition rate | TPA yield | Color | | |
|---|---|---|---|---|---|
| | (%) | (%) | L | a | b |
| Example 1 | 93.8 | 93.1 | 90.8 | −0.9 | 0.0 |
| Example 2 | 96.4 | 92.8 | 89.3 | −1.2 | −1.3 |
| Example 3 | 98 or more | 88.6 | 84.7 | 0.0 | 0.1 |
| Example 4 | 78.2 | 70.56 | 76.5 | 1.5 | 0.8 |
| Example 5 | 98 or more | 80.43 | 82.1 | 0.6 | 0.5 |
| Comparative Example 1 | 81.2 | 64.67 | 64.6 | 4.3 | 1.2 |
| Comparative Example 2 | 72.4 | 53.56 | 58.5 | 2.2 | 4.1 |

Referring to Table 1, Examples 1 to 5 exhibited excellent PET decomposition rates and TPA yields, compared with Comparative Examples 1 and 2. In Comparative Example 1 using no degradation agent, the terephthalic acid yield was lowered by many unreacted and by-reacted materials due to neutral water depolymerization, and in Comparative Example 2 using normal steam rather than the superheated water vapor, the PET decomposition rate and the TPA yield were lowered despite six times longer depolymerization time.

On the other hand, in Example 4 using in an amount of 1.0 mol of the degradation agent, which was less than a substantially required amount of 2.0 mol, PET was expected to not be completely decomposed. However, the reason of obtaining a higher decomposition rate than a predicted decomposition rate according to an equivalent ratio was that thermal decomposition at a high temperature of 350° C. was concurrently performed. However, the TPA yield thereof was lowered by the unreacted and by-reacted materials, as expected.

In Example 5 using 3.3 mol of the degradation agent, the by-reactants were more produced beyond an appropriate level of the depolymerization, and in addition, terephthalic acid was recovered at a lower yield and lower purity. Based on this, the L value thereof was lowered by the side reactions during repolymerization of final polyester after purification through crystallization.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

INDUSTRIAL APPLICABILITY

The present invention relates to a method for rapid depolymerization of polyester which can depolymerize colored polyesters in a short time while removing dyes from colored polyesters at a low cost and with high efficiency, has high depolymerization efficiency, and is economical because the entire depolymerization composition does not need to be heated to the depolymerization temperature.

The invention claimed is:

1. A method of depolymerizing a polyester, comprising:
adding a degradation agent including an alkali, an acid, a salt thereof, a mono-alcohol, a polyhydric alcohol, or a mixture thereof to the polyester, and
contacting the polyester with superheated water vapor.

2. The method of depolymerizing the polyester of claim 1, wherein
a temperature of the superheated water vapor is 250° C. to 450° C.

3. The method of depolymerizing the polyester of claim 1, wherein
the superheated water vapor is applied with an injection pressure of 0.1 bar to 2 bar.

4. The method of depolymerizing the polyester of claim 1, wherein
the depolymerizing is performed for 1 minute to 120 minutes.

5. The method of depolymerizing the polyester of claim 1, wherein
the alkali includes sodium hydroxide, potassium hydroxide, lithium hydroxide, ammonia, or a mixture thereof.

6. The method of depolymerizing the polyester of claim 1, wherein
the acid includes hydrochloric acid, nitric acid, sulfuric acid, carbonic acid, phosphoric acid, acetic acid, hypochlorous acid (HCIO), or a mixture thereof.

7. The method of depolymerizing the polyester of claim 1, wherein
the salt includes carbonate, hydrogen carbonate, phosphate, sulfate, sulfite, nitrate, silicate, hypochlorate, formate, acetate, citrate, oxalate, or a mixture thereof.

8. The method of depolymerizing the polyester of claim 1, wherein
the mono-alcohol includes methanol, ethanol, propanol, butanol, or a mixture thereof.

9. The method of depolymerizing the polyester of claim 1, wherein
the polyhydric alcohol includes ethylene glycol, n-propylene glycol, isopropylene glycol, diethylene glycol, polyethylene glycol, triethylene glycol, dipropylene glycol, 1,3-butanediol, 1,4-butanediol, glycerine, benzyl alcohol, polypropylene glycol, pentaerythritol, trimethylolpropane, or a mixture thereof.

10. The method of depolymerizing the polyester of claim 1, wherein
the polyester is made by polymerizing a dibasic acid with alkylene glycol, and
the degradation agent is added at 0.75 mol to 3.0 mol per 1.0 mol of the dibasic acid in the polyester.

11. The method of depolymerizing the polyester of claim 1, wherein
the method of depolymerizing the polyester further includes,
the performing solid-liquid separation of liquid-phase alkylene glycol and a solid-phase dibasic salt from the depolymerization product obtained in the depolymerizing,
dissolving the solid-phase dibasic salt in water,
neutralizing an aqueous solution of the dibasic salt with an acid to precipitate a dibasic acid crystal, and
performing solid-liquid separation of the dibasic acid crystal from a precipitation product.

12. The method of depolymerizing the polyester of claim 1, wherein
the method of depolymerizing the polyester further includes removing impurities from the aqueous solution of the dibasic salt.

13. The method of depolymerizing the polyester of claim 1, wherein
the method of depolymerizing the polyester further includes recrystallizing the dibasic acid crystal.

14. A composition for polymerizing recycled polyester, comprising a dibasic acid and an alkylene glycol, obtained by the method of depolymerizing the polyester of claim 1.

15. A recycled polyester prepared using the composition for polymerizing polyester of claim 14.

16. The recycled polyester of claim 15, wherein
a color of the recycled polyester has an L-value of 60 or higher.

* * * * *